United States Patent [19]

Ferren et al.

[11] 4,225,482

[45] Sep. 30, 1980

[54] CONCENTRATED AQUEOUS LATEX OF ETHYLENE/$C_2$-$C_3$-PERFLUOROCARBON COPOLYMER OR TERPOLYMER

[75] Inventors: Richard A. Ferren, Ambler; Daniel A. Dimmig, King of Prussia; John C. Grigger, Oreland, all of Pa.

[73] Assignee: Pennwalt Corporation, Philadelphia, Pa.

[21] Appl. No.: 968,831

[22] Filed: Dec. 12, 1978

[51] Int. Cl.$^2$ ............................................. C08L 27/18
[52] U.S. Cl. ................................ 260/29.6 F; 428/421; 526/254
[58] Field of Search ................ 260/29.6 F, 42.27; 526/254, 255; 428/421, 422, 442, 463

[56] References Cited

U.S. PATENT DOCUMENTS

| | | | |
|---|---|---|---|
| 3,303,154 | 2/1967 | Hirose | 260/29.6 F |
| 3,445,434 | 5/1969 | Stilmar | 526/255 |
| 3,870,689 | 3/1975 | Modena | 526/255 |
| 3,893,971 | 7/1975 | Ukihashi | 260/42.27 |
| 3,906,060 | 9/1975 | Mattiussi | 260/42.27 |
| 3,989,873 | 11/1976 | Robertson | 428/422 |
| 4,033,939 | 7/1977 | Schulze | 526/255 |
| 4,110,308 | 8/1978 | Abe | 260/42.27 |
| 4,123,602 | 10/1978 | Ukihashi | 526/255 |

*Primary Examiner*—Paul R. Michl

[57] ABSTRACT

A process for preparing an aqueous concentrated latex of a copolymer or terpolymer of ethylene and a $C_2$–$C_3$-perfluorocarbon by creaming a latex of 25–30% copolymer solids and recovering a concentrated latex having 1.5–2.5 times the concentration of the starting latex. The concentrated latex can be used to prepare crack-free or void-free coatings on substrates.

4 Claims, No Drawings

CONCENTRATED AQUEOUS LATEX OF ETHYLENE/$C_2$-$C_3$-PERFLUOROCARBON COPOLYMER OR TERPOLYMER

This invention relates to a concentrated latex of ethylene/perfluorocarbon, a method of preparing that latex and the use of it in preparing thick non-porous coatings.

Perfluorocarbons, such as tetrafluoroethylene and hexafluoropropylene, are well known monomers which can be polymerized to produce polymers having especially attractive properties. Such polymers have the best chemical resistance of any known plastic material and have antifriction properties which make them highly desirable in many bearing applications. Furthermore, these polymers are so inert to other materials that it is extremely difficult to find anything which will attack the surface of such polymers, and hence they have been used for the coating of cooking utensils and other similar applications wherein the polymeric material is used as a coating for long-term usage in severe thermal and chemical environments. The difficulty with the use of perfluorocarbon polymers is that they are not easy to fabricate. In general, coatings of such materials are applied to a substrate in the form of a suspension or an emulsion, the liquid vehicle is then removed by evaporation, and the remaining particles of polymer are cohered into a coating by treatment at a high temperature (e.g. 380° C.), at which temperature the particles are sintered into a substantially homogenious coating. These polymers do not change from a solid into a molten mass which flows as a liquid. When coatings of these materials are made in any thicknesses greater than about 1 mil (0.001 inch) by the above described method of evaporating the liquid vehicle and sintering the remaining solid material, the coating develops "mud cracks" which extend through the coating to the substrate and thus effectively destroy the protection of the substrate. While "mud cracks" do not usually occur in thin films it has been almost impossible to make void-free coatings of tetrafluoroethylene polymers. Attempts have been made to overcome these inherent difficulties by employing copolymers of the perfluorocarbon with other materials which have melt flow characteristics. These attempts have been less than truly successful because, for the most part, when sufficient comonomer is employed to provide the minimum melt flow characteristic the desirable properties of the perfluorocarbon, i.e. chemical resistance, inertness, tensile strength, etc., are diluted to such an extent that the expense of employing the perfluorocarbon is no longer warranted. In other attempts to solve this problem use has been made of monomers which are partially fluorinated, such as vinyl fluoride and vinylidene fluoride, but these monomers do not provide the chemical resistance and high melting point that are desired.

It is an object of this invention to provide a method for making a concentrated copolymer latex which has a sufficiently high content of perfluorocarbon to maintain the desirable chemical properties and yet be able to provide thick crack-free coatings and thin void-free coatings that have not been available in the past. It is another object of this invention to provide an aqueous latex ethylene/$C_2$-$C_3$-perfluorocarbon copolymer or terpolymer. It is another object of this invention to provide concentrated aqueous latices of ethylene/$C_2$-$C_3$-perfluorocarbon. It is another object of this invention to provide coatings of such copolymers onto glass substrates in thicknesses greater than 1 mil and having no detectable porosity. It is still another object of this invention to provide copolymer latices containing a small portion of glass, mica, or steel flakes which permits the preparation of coatings 2–3 mils in thickness having no evidence of "mud cracks". Still further objects will appear from the more detailed description of this invention which follows.

In accordance with this invention there is provided a process for preparing a water-based concentrated latex of approximately equimolar amounts of a copolymer of ethylene and tetrafluoroethylene and 0–10 mole % hexafluoropropylene which comprises mixing at about 30°–80° C. an aqueous latex containing about 25–30% solids of this copolymer or terpolymer and 6–20% by weight of the latex solids of a surfactant, allowing the mixture to stand quiescent until two layers form, separating off the upper layer, and recovering the lower layer as a concentrated latex containing 1.5 to 2.5 times the percent solids content of the starting latex. In one embodiment of this invention glass is coated with a crack-free coating greater than 1 mil thick by applying the concentrated latex described above to a glass substrate, drying the coating, and curing the coating by heating it to a temperature of at least 300° C. In still another embodiment of this invention the concentrated latex described above is mixed thoroughly with a filler of 5–15% by weight of glass fibers, mica, or flake steel, drying the coating and curing at a temperature of at least 300° C. to produce a crack-free coating having a thickness greater than 1 mil.

The copolymer latices of this invention are made by known processes for emulsion or suspension polymerization. These processes normally include the charging of an autoclave with a mixture of the gaseous monomers in the desired proportions and in the presence of a suitable liquid vehicle, a surfactant, and a polymerization initiator. A typical polymerization involves the use of tertiary butyl alcohol in a large amount of water as the liquid vehicle, ammonium persulfate as the polymerization initiator and sodium phosphate as the buffer and ammonium perfluorooctanate as the surfactant. This mixture might be agitated and heated at a temperature of about 75° C. and a pressure of 450 psig until the reaction is completed and the resulting product is a suspension of small copolymer particles in the aqueous alcohol reaction medium. Combinations of other components in the liquid vehicle along with other initiators and surfactants may be employed to produce substantially the same results in accordance with well known procedures of the prior art.

The suspensions or latices produced by these prior art processes normally contain 25–30% copolymer solids which in accordance with the process of the present invention is concentrated to a level of about 45–60% or more solids content. To the starting latex there is added 6–20% by weight of the total latex of a nonionic surfactant such as Triton X-114, Triton N-101, Triton X-100, Triton CF-10, Pluronic L-64, etc. (Triton is a trademark of Rohm and Haas Co. and it refers to nonionic surfactants that are alkyaryl polyether compounds. Pluronic is a trademark of BASF Wyandotte Co. and it refers to nonionic surfactants that are polyols of block copolymers containing polyoxypropylene.) This mixture is then agitated by stirring at a temperature in the range of 30°–80° C. for approximately one half hour, the agitation is stopped and the mixture is allowed to stand until it separates into two layers, the upper layer being substantially clear liquid and the lower layer being the concentrated "cream" layer containing substantially all of the solid particles. By decanting the upper layer there is recovered a concentrated latex containing 1.5-2.5 times the concentration of copolymer solids that was available in the starting latex.

The concentrated aqueous latex of this invention is an excellent coating material for producing copolymer coatings that are thicker than normal and yet are non-porous and do not exhibit "mud cracking". Dip coating of aluminum coated with Alodine (trademark of Amchem Products, Inc. for its phosphate and chromate chemical conversion coating composition) employing a concentrated latex of 45-50% solids provides with a single coating dip a crack-free coating of about 0.5 mil thickness. Surprisingly it was found that when glass was coated by such a concentrated aqueous latex a coating thickness of 1.5-2 mils could be obtained without producing any porosity. On fiberglass cloth the interstices of the cloth could be completely eliminated by a series of three dip coatings to produce a smooth coherent nonporous coating.

It was also found that the concentrated aqueous latex of this invention could be filled with any suitable inert filler, such as glass fibers, mica, or flake steel to the extent of about 5-15% by weight of the latex and the resulting composition was able to provide 1.5-2- mil coatings onto Alodine coated aluminum without the production of any cracks or porosity. The filled compositions are prepared merely by mixing with any suitable stirring mechanism the required amount of filler in the concentrated aqueous latex. Glass fibers that are chopped to a length of about 1/64 inch are most desirable. Any suitable flake filler, such as mica and flake steel of very small particle size provide similar results. The coating is readily prepared by one or more dip cycles followed by drying the coating to remove the liquid vehicle and curing of the copolymer solids by heating at a temperature of about 300° C. Other methods of coating than dip coating are, of course, also suitable to produce the same quality of copolymer coating.

The composition of the coating of this invention is one which is substantially equimolar with respect to ethylene and tetrafluoroethylene and may or may not also contain a small proportion of hexafluoropropylene. On a weight basis this amounts to 40-50% ethylene and 50-60% perfluorocarbon. One preferred combination is a copolymer of ethylene and tetrafluoroethylene. Another preferred embodiment is a terpolymer of ethylene, tetrafluoroethylene, and up to 10 mole % hexafluoropropylene.

The coatings of this invention are particularly useful in providing a corrosion resistant void-free, stable coating onto substrates such as glass, aluminum, steel, brass, etc. The ultimate use of the coated material is found in many possibilities in the chemical processing industry, petroleum industry, decorative coating industry for coatings exposed to the atmosphere, etc.

In the following examples there are illustrations of certain preferred embodiments of this invention showing the preparation of the copolymer latex, the concentration of that latex, and the use of the concentrated latex in coating various materials. It is not intended that this invention shall be limited by the scope of these illustrations other than the fact that they present preferred embodiments. Unless otherwise indicated parts and percentages are by weight, temperatures are in degrees Centigrade, and pressures are in pounds per square inch.

EXAMPLE 1

A clean 2-gallon horizontal stainless steel autoclave sparged with nitrogen to remove air was charged with: 135 grams of tertiary butyl alcohol, 3.0 grams of isopropyl alcohol, 9.0 grams of ammonium perfluorooctoanoate, 1.5 grams ammonium persulfate, 4.5 grams sodium phosphate dodecahydrate and 4500 ml. of water. During a reaction time slightly less than 5 hours, a gas mixture of tetrafluoroethylene/ethylene in the molar ratio of 55/45, respectively, was fed into the reactor at 75° C. and a pressure of 450 psig. During this time, the contents of the autoclave were agitated with a 4-bladed stirrer.

Most of the copolymer was obtained in the form of a latex. The latex contained 27.1% copolymer solids or about 1800 grams of resin on a dry basis. The composition of the copolymer on a molar basis was 52% tetrafluoroethylene and 48% ethylene. The resin had a melting point of 277° C. and had a tensile strength of 6800 psi with a corresponding elongation of 300%.

EXAMPLE 2

In the same equipment and following the same procedure as described in Example 1 there was charged into the autoclave 135 grams of tertiary butyl alcohol, 4.5 grams of isopropyl alcohol, 9.0 grams of ammonium perfluorooctoanoate, 3.0 grams of ammonium persulfate, 7.5 grams of sodium phosphate dodecahydrate and 4500 ml. of water. During a reaction time of slightly over 3 hours a gas mixture of tetrafluoroethylene/ethylene in a molar ratio of 58/42, respectively, was fed into the reaction maintained at 75° C. and a pressure of 450 psig. while the mixture was agitated with a 4-bladed stirrer.

Most of the copolymer was obtained in the form of a latex containing 26.5% copolymer solids or about 1800 grams of resin on a dry basis. The composition of the copolymer on a molar basis was 53% tetrafluoroethylene and 47% ethylene. The resin had a melting point of 275° C., a tensile strength of 3500 psi and an elongation of 100%.

EXAMPLE 3

In the same equipment and following the same procedure as in Example 1 there was charged into the autoclave the same amounts of all ingredients specified in Example 1 except that 3.0 grams of ammonium persulfate was used and there was also included 135 grams of a food grade wax (Gulfwax) having a melting point of 50° C. The molar ratio of tetrafluoroethylene/ethylene, the reaction temperature, the reaction pressure and the agitator were the same as in Example 1.

Most of the copolymer was obtained in the form of a latex containing 29.2% copolymer solids or about 1880 grams of resin on a dry basis. The composition of the copolymer on a molar basis was 53% tetrafluoroethylene and 47% ethylene. The resin had a melting point of 279° C., a tensile strength of 7200 psi and an elongation of 320%.

EXAMPLE 4

The same equipment, procedure and ingredients as described in Example 3 were used except to include 135 grams of VSP heavy oil (Kaydol) in place of the food grade wax, and the molar ratio of tetrafluoroethylene/ethylene was 54/46.

Most of the copolymer was obtained in the form of a latex containing 29.0% solids or about 1870 grams of resin in a dry basis. The composition of the copolymer on a molar basis was 51% tetrafluoroethylene and 49% ethylene. The resin had a melting point of 277° C., a tensile strength of 7100 psi and an elongation of 300%.

EXAMPLE 5

A mixture of 290 g. of the copolymer latex of Example 4 and 12.2 g. of Triton X-114 surfactant was added to a 250 ml., jacketed, glass tube equipped with a metal stirring blade (6×0.75×.03 inch). Temperature was maintained at 40° C. by water circulation. The mixture was stirred for 30 minutes at 90 rpm and then the stirring blade was removed and the mixture allowed to stand quiescent. After 5.5 hours at 40° C., the two layers were separated to give 165 g. of a bottom creamed layer and 132 g. of top skim layer. The cream layer contained 51% copolymer solids and the clear skim layer contained less than 1% of the total copolymer charged. Approxmately 35% of the total surfactant was present in the cream layer.

EXAMPLE 6

Using the procedure of Example 5, 280 g. of the copolymer latex of Example 2 and 9.0 g. of Triton X-114 surfactant were mixed and held at 40° C. for a total of 17 hours. Separation of the two layers gave 125 g. of cream layer with a copolymer solids content of 59.7% and 163 g. of clear skim layer essentially free of copolymer. Approximately 20% of the total surfactant was present in the cream layer.

EXAMPLE 7

A mixture of 256 g. of the copolymer latex of Example 3 and 37.5 g. of a 30 wt. % aqueous solution of Triton N-101 surfactant was stirred for one hour with circulating water at 70° C. The mixture was then allowed to settle (no stirring) for an additional 5 hours at 70° C. Separation of the two layers gave 142 g. of cream layer with a copolymer solids content of 51.5% and 145 g. of a slightly turbid skim layer containing approximately 2% of the total copolymer charged.

EXAMPLE 8

Alodine coated aluminum strips were dipped once in a concentrated latex of tetrafluoroethylene/ethylene copolymer latex of 45-50% solids content (50-60 mol % tetrafluoroethylene and 50-40% ethylene) similar to those prepared as described in Examples 1-7 above. The aluminum strips, after being coated by the single dip in the latex, were dried in air for 3-5 minutes followed by curing in a forced draft air oven at 300°-310° C. for 5 minutes. The coating was about 0.5 mil thick and entirely free of pores or cracks as judged by excellent corrosion resistance. The coatings exhibited excellent adhesion to the metal substrate.

When the same procedure was employed on glass slides, the same results were achieved except that the coating was approximately 1-mil thick with no pores or cracks.

EXAMPLE 9

A concentrated copolymer latex containing 60% copolymer solids prepared as described in Examples 5-7, was mixed with 10% (by weight of total latex) of chopped glass fiber 1/64 in length and then used to dip coat alodine coated aluminum strips. The coatings were treated as described in Example 8 to produce 1.5-2-mil coatings that were free of pores and cracks.

The same results were obtained when mica and flake steel were used separately to replace the fiber glass.

EXAMPLE 10

A fiberglass cloth was dip coated, using three succeeding dips, in a latex of 48% copolymer solids content similar to those of Examples 5-7. The result was a continuous coating without pores or cracks. When a 60% solids latex was employed the continuous coating was obtained with a single dip.

Although the invention has been described in considerable detail with reference to certain preferred embodiments thereof, it will be understood that variations and modifications can be effected within the spirit and scope of the invention as described hereinabove and as defined in the appended claims.

What is claimed is:

1. A process for preparing a water-based concentrated latex of a copolymer or terpolymer containing approximately equimolar amounts of ethylene and tetrafluoroethylene and 0-10 mole % hexafluoropropylene which comprises mixing at about 30°-80° C. an aqueous latex containing about 25-30% solids of said copolymer or terpolymer and 6-20% by weight of the latex solids of a surfactant, allowing the mixture to stand quiescent until two layers form, separating off the upper layer and recovering the lower layer as a concentrated latex containing 1.5 to 2.5 times the percent solids content of the starting latex.

2. The process of claim 1 wherein said copolymer has a melting point of at least 225° C., a tensile strength of at least 6000 psi and an elongation of not more than 300%.

3. The process of claim 1 where said surfactant is selected from the group consisting of alkylaryl polyethers and polyols of block copolymers containing polyoxypropylene.

4. The process of claim 1 where the starting latex has a solids content of 25-30% and the concentrated product has a solids content of 45-60%.

* * * * *